United States Patent [19]

Tnoue et al.

[11] 3,944,361

[45] Mar. 16, 1976

[54] COPYING DEVICE

[75] Inventors: Mutsuhiro Tnoue, Sagamihara; Ryoichi Konishi, Tokyo, both of Japan

[73] Assignee: The United States of America as represented by the Secretary of the Army, Washington, D.C.

[22] Filed: July 29, 1974

[21] Appl. No.: 492,983

Related U.S. Application Data

[63] Continuation of Ser. No. 294,933, Oct. 4, 1972, abandoned.

[30] Foreign Application Priority Data

Oct. 5, 1971 Japan ........................ 46-78509[U]

[52] U.S. Cl. .................... 355/27; 219/216; 355/45; 354/83

[51] Int. Cl.$^2$ .......................................... G03B 27/32

[58] Field of Search .................. 354/83; 355/27, 45; 219/216

[56] References Cited

UNITED STATES PATENTS

| | | | |
|---|---|---|---|
| 2,769,369 | 11/1956 | Oiler | 354/83 |
| 3,585,917 | 6/1971 | Griffith | 219/216 X |
| 3,645,883 | 2/1972 | Luebbe | 355/3 |

FOREIGN PATENTS OR APPLICATIONS

| | | | |
|---|---|---|---|
| 1,176,183 | 11/1958 | France | 354/83 |

*Primary Examiner*—John F. Gonzales
*Attorney, Agent, or Firm*—Nathan Edelberg; Robert P. Gibson; A. Victor Erkkila

[57] ABSTRACT

Copying method comprises applying uniformly an auxiliarly heating treatment to the whole surface of a thermally developable photosensitive material containing organic salt at a temperature within a developing temperature range appropriate to the photosensitive material before image exposure, and heating for developing after exposure.

5 Claims, 3 Drawing Figures

COPYING DEVICE

This is a continuation, of application Ser. No. 294,933, filed Oct. 4, 1972 "COPYING METHOD", and now abandoned.

BACKGROUND OF THE INVENTION

1. Field of the Invention

This invention relates to a copying device for reproducing an image on a thermally developable photosensitive material.

2. Description of the Prior Art

There have been known various methods for regenerating or copying an image by light. Among these methods, a representative method is a silver halide method. According to this method, a silver halide photosensitive film or photosensitive paper is imagewise exposed to form a latent image, and the resulting latent image is developed with a developing chemical solution and fixed.

Another representative method is an electrophotographic method.

However, these copying processes need exposure, developing and fixing treatments and therefore the treating process is disadvantageously complicated. In addition, the film should be washed with water after treatment since various chemicals are used in the silver halide method.

A novel photosensitive material has been recently developed which does not need any developing treatment by chemicals and fixing treatment. Such photosensitive material is known as Dry Silver Film (trade name, supplied by Minnesota Mining & Manufacturing Co.) and the image recording is effected by a completely dry system, i.e., imagewise exposure, and thermal developing. Thus the film treating process can be simplified. However, in this photosensitive material, various types of material having different photographic characteristics, are not available and therefore, the applicable range is limited. In the field of microfilm, the original is mainly a written document and therefore, it is desirable that the $\gamma$ value of a photosensitive material is large. Since the above mentioned photosensitive material has only a limited field of application, upon applying the photosensitive material to a microfilm field it is necessary to vary the photographic characteristics of the photosensitive material be changing the developing temperature and time, but it is not possible to make wide changes, and in addition, the treatment is complicated.

There is also a method for improving photographic characteristics by using auxiliary exposure effect, but it is not possible to change, widely, the photographic characteristics.

SUMMARY OF THE INVENTION

According to one aspect of the present invention, there is provided a copying device for reproducing an image on a thermally developable photosensitive material which comprises a thermally developable photosensitive material retained in a photographing position by a light transparent holding member, a member for uniformly heating one side of the light transparent holding member so as to apply heat to a photosensitive surface of the thermally developable photosensitive material, and an optical means for projecting an original image to the light transparent holding member, the optical member being disposed at a side opposite to the heating side of the light transparent holding member with respect to the light transparent holding member.

According to another aspect of the present invention, there is provided a film reader printer which comprises an optical source means for irradiating a microfilm bearing an image, a projecting lens, a transparent support for holding a thermally developable copying sheet at an exposure position, a light transparent conductive member uniformly overlying one side of the transparent support on which a copying sheet is placed, electrodes connected to the light transparent conductive member capable of applying voltage to the light transparent conductive member, a screen for observing an image of the film projected by the projecting lens, a reflecting mirror provided movably on a light path of the projecting lens, and the reflecting mirror projecting a light image passing through the projecting lens to the screen.

An object of this invention is to provide a simple and compact copying device free from the above mentioned disadvantages of conventional copying devices.

Another object of this invention is to provide a copying device having a mechanism capable of improving photographic characteristics of thermally developable photosensitive materials.

A further object of this invention is to provide a copying device by which imagewise exposure and developing treatment can be continuously effected keeping a photosensitive material at a definite position.

DESCRIPTION OF THE PREFERRED EMBODIMENTS

Figure 1:
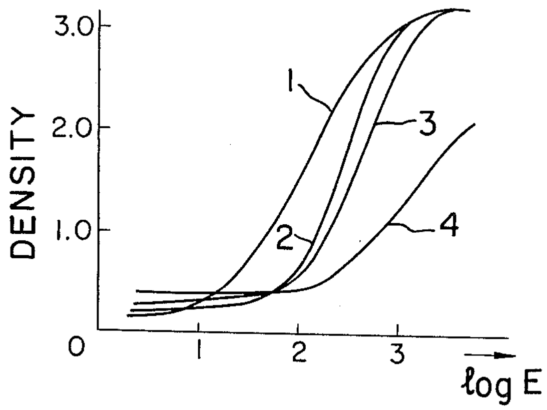
FIG. 1 is a graph showing a relation between a developed silver salt film and a exposure amount.

As thermally developable photosensitive material used in this invention, there may be used the following materials.

1. A sheet material having a coating layer comprising an image forming composition containing an oxidizing agent and a reducing agent and a relatively small amount of radiation susceptible heavy metal salt, which can separate a free metal upon irradiated being in contact with the image forming composition.

2. A sheet material having a coating layer comprising an organic silver salt having silver ions associating in a form of group in a molecule, a catalytic amount of a photoreducing silver halide, which is distributed in the whole body of the organic silver salt and is catalytically contacted with almost all of the silver ions of said organic silver salt, and a mild reducing agent.

Representative oxidizing agents as mentioned above may be organic silver salts such as, for example orthosulfobenzimide silver salt, silver 5-chlorosalicylamide oxime, silver 5-nitrosalicylamide oxime, and salt of long chain fatty acids such as silver behenate.

As representative reducing agent, there may be mentioned organic compounds such as, for example substituted pyrazolidone, substituted and unsubstituted hydroxylamine, aminophenol and dihydric phenol.

As representative radiation susceptible heavy metals, there may be mentioned inorganic or organic salts of silver, copper, chromium, and cobalt. When these heavy metal salts are activated by a radiation wave, they are reduced to free metal, that is, elementary metal.

The thermally developable silver salt photosensitive material of the present invention may be prepared by coating a sheet support such as, for example wood pulp paper, cellulose acetate, and polyethylene terephthalate with the image forming composition and the radiation susceptible salt by using an adhesive such as, for example a copolymer of butadiene and styrene, polyethylene glycol, polyamide and the like.

Other thermally developable silver salt photosensitive materials in item (2) above, may be produced by coating an organic silver salt such as, for example silver behenate, silver stearate and the like, a silver halide and a mild reducing agent such as, for example hydroquinone, methyl hydroxy naphthalene, catechol and the like, on a polyethylene terephthalate support.

The thermally developable photosensitive material is exposed to a light image for a short period of time, and then the whole surface of the exposed portion is uniformly heated at an appropriate temperature for an appropriate period of time to produce an eternal visible recording.

According to the present invention, the thermally developable photosensitive material is heated at a temperature within a developing temperature range appropriate to the photosensitive material before image exposure (auxiliary heating).

The auxiliary heating temperature varies depending upon the developing temperature range appropriate to the photosensitive material, and in general, a temperature of 90°C – 160°C is used.

When the auxiliary heating temperature is higher than the upper limit of the developing temperature range, base density of the photosensitive material increases to form fog and damages the photosensitive material.

The lowest temperature of auxiliary heating depends upon the lowest temperature at which the photosensitive material can be developed, and when the lowest auxiliary heating temperature is lower than the lowest temperature at which the photosensitive member can be developed, the effect is poor and the improvement can not be attained.

Auxiliary heating treatment may be conducted for a period of time less than twice the developing time appropriate to the photosensitive material.

Thus, photographic characteristics of the photosensitive material can be improved and the $\gamma$ value can be changed by applying an auxiliary heating treatment under the above-mentioned temperature and time conditions.

Figure 2:
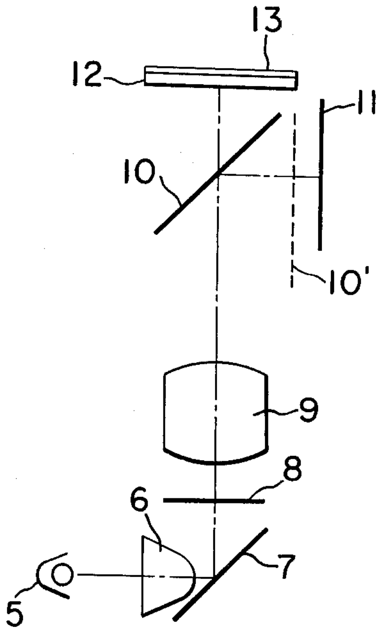
FIG. 2 shows schematically a reader printer.

Referring to FIG. 2, reference numerals 5, 6 and 7 denote an illuminating light source of a light having a wavelength ranging from 450 to 550 millimicrons, a condenser lens and a reflecting mirror, respectively. A microfilm is placed between reflecting mirror 7 and a projecting lens 9, and a reflecting mirror 10 is provided rotatably on a light path of the projecting lens 9. A transparent screen 11 is provided in front of a reader, and a table 12 for copying film is placed over the reflecting mirror 10. A thermally developable silver salt film 13 is placed on the table 12 in such a way that the photosensitive agent surface closely contacts the exposing surface of the table 12. When the reflecting mirror 10 is placed at a position indicated by a solid line, FIG. 2 the image of the microfilm 8 is projected to the screen 11 by way of the projecting lens 9 and the reflecting mirror 10, but not to the table 12. For the purpose of copying an image of the microfilm 8, the reflecting mirror 10 is shifted to a position as indicated by a broken line 10' and the image of the microfilm 8 is projected to the copying film 13 placed on the table 12.

Figure 3:
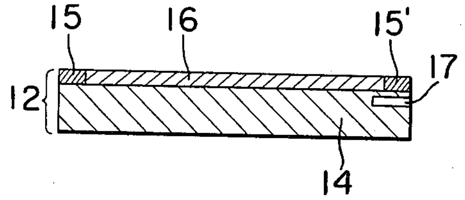
FIG. 3 shows diagrammatically an enlarged cross sectional view of a table in FIG. 2.

Referring to FIG. 3, the table 12 comprises a transparent member 14, such as glass plate, and a coating layer of transparent conductive material such as tin oxide film 16 of uniform thickness overlies the transparent member, and electrodes 15, 15' connected with a power source are provided at both ends thereof. A thermistor 17, for measuring temperature, is mounted on one end of the transparent member 14 so as to control the auxiliary heating temperature. When voltage is applied to both electrodes 15, 15', Joule's heat is generated in a coating layer of transparent conductive material such as tin oxide film 16 to raise the temperature of the transparent member 14. After observing a recorded image of the microfilm 8 on the screen 11, and if a hard copy is necessary, pushing a copying button (not shown) results in applying voltage between the electrodes 15 and 15' to the heat table 12, and consequently heat the thermally developable silver salt film 13, closely contacting a table 12, and therefore, the auxiliary heat is applied to the film 13. After the auxiliary heating is finished, the reflecting mirror 10 is transferred from the position indicated by the solid line to the position indicated by the broken line 10', and the silver salt film 13 is subjected to imagewise exposure. After exposure, the reflecting mirror 10 returns to the original position and the silver salt film 13 is then heated by table 12 and a complete hard copy is obtained. When the copying film 13 is heated simultaneously with the exposure, there is obtained the same effect, as above. Since glass has low thermal conductivity, it is easy to maintain it at a constant temperature and developing can be effected immediately after heating. Further, a heating plate, other than the transparent member 12, may be used. In case the photosensitive characteristics of the copying film 13 are changed as by heating before and during exposure and the copying film is further heated for developing, and if the transparent member 12 is kept at a constant temperature for a long period of time in the above mentioned device, it is possible to continuously effect heating before exposure, heating during exposure and developing heating.

The following examples are given for illustrating the present invention, but are by no means, for restricting the present invention.

EXAMPLE 1

Dry silver Type 796 (trade name, supplied by Minesota Mining and Manufacturing Co.) was used as the heat developable silver salt photosensitive material. This photosensitive film was heated, before exposure, at 130°C for 10, 20 and 30 seconds. Then, this photosensitive film was exposed to a fluorescent lamp (15W) at a distance of 50 mm. After exposure, each photosensitive film was developed by heating the photosensitive film at 130°C for 10 seconds. The result is shown in the graph of FIG. 1, in which the abscissa represents the logarithm of an exposure amount E and the ordinate represents the density of the thermally developable silver salt film after, exposure heat treatment. Curve 1 represents a characteristic curve of a photosensitive film, which was exposed and developed without auxiliary heating. Curves 2, 3 and 4 are characteristic curves of photosensitive films, which were exposed and developed after auxiliary heating for 10, 20 and 30 seconds, respectively. As a result, $\gamma$ values of the photosensitive films were 2.0, 3.0, 2.5 and 1.4, respectively. This result shows that the $\gamma$ value increases from 2.0 to 3.0.

EXAMPLE 2

Dry Silver Type 790 (trade name, supplied by Minesota Mining and Manufacturing Co.) was used as the photosensitive material. This photosensitive paper was treated that of a way similar to in Example 1. The $\gamma$ value of the photosensitive paper, subjected to an auxiliary heating before exposure, increased by a maximum of 50 percent, as compared with that which was not subjected to auxiliary heating before exposure.

We claim:

1. A film reader printer which comprises an optical source means for irradiating a microfilm bearing an image, a projecting lens, a transparent support for holding a thermally developable copying sheet at an exposure position, a light transparent conductive member uniformly overlying one side of the transparent support on which a copying sheet is placed, the transparent support being a glass plate and the light transparent conductive member being made of tin oxide, electrodes connected to the light transparent conductive member capable of applying voltage to the light transparent conductive member, said conductive member generating heat by the flow of electric current to thereby heat the copying sheet, a screen for observing an image of the film projected by the projecting lens, a reflecting mirror movable on a light path of the projecting lens, and the reflecting mirror projecting a light image passing through the projecting lens to the screen.

2. A film reader printer which comprises an optical source means for irradiating a microfilm bearing an image, a projecting lens, a support for holding a thermally developable copying sheet at an exposure position, an electroconductive member made of tin oxide and overlying one side of the support on which a copying sheet is placed, means for applying voltage to the electroconductive member, said electroconductive member generating heat by the flow of electric current to thereby heat the copying sheet, a screen for observing an image of the film projected by the projecting lens, and means for selectively projecting a light image passing through the projecting lens to one of, the screen and the copying sheet.

3. A copying device for reproducing an image on a thermally developable photosensitive material which comprises a supporting member for holding the photosensitive material at an exposure position, an electric conductive material uniformly coated on a surface, opposite to that contacting the photosensitive material, of the supporting member, a means for applying voltage to the electroconductive material so as to heat the electroconductive material, said means being connected with the electroconductive material, said electroconductive material generating heat by the flow of electric current, and an optical means for projecting a light image of an original to be copied to the photosensitive material uniformly contacting the surface of the supporting member coated with the electroconductive material.

4. A copying device according to claim 3 in which the electroconductive material is made of tin oxide.

5. A copying device according to claim 3 in which the means for applying voltage works to apply voltage to the electroconductive material before and during the imagewise exposure.

* * * * *

UNITED STATES PATENT OFFICE
CERTIFICATE OF CORRECTION

Patent No. 3,944,361 Dated March 16, 1976

Inventor(s) MUTSUHIRO INOUE AND RYOICHI KONISHI

It is certified that error appears in the above-identified patent and that said Letters Patent are hereby corrected as shown below:

Correct the spelling of the inventor's name from "TNOUE" to --INOUE-- (all occurrences).

Correct the Assignee from "The United States of America as represented by the Secretary of the Army, Washington, D.C." to --CANON KABUSHIKI KAISHA--.

Column 1, line 48, delete "be" and insert --by--.

Column 2, line 48, delete "irradiated being" and insert --being irradiated--.

Signed and Sealed this

Twenty-fourth Day of August 1976

[SEAL]

*Attest:*

RUTH C. MASON
*Attesting Officer*

C. MARSHALL DANN
*Commissioner of Patents and Trademarks*